United States Patent [19]

Baumann

[11] 4,138,414
[45] Feb. 6, 1979

[54] 2-PHENOXY AND 2-PHENYLTHIO ANTHRAQUINONE DISPERSE DYES

[75] Inventor: Werner Baumann, Therwil, Switzerland

[73] Assignee: Sandoz Ltd., Basel, Switzerland

[21] Appl. No.: 770,920

[22] Filed: Feb. 22, 1977

[30] Foreign Application Priority Data

Feb. 26, 1976 [CH] Switzerland ............... 2371/76

[51] Int. Cl.$^2$ ............... C09B 1/36; D06P 1/18; D06P 3/48; D06P 3/54
[52] U.S. Cl. ............... 260/372; 260/376; 260/377
[58] Field of Search ............... 260/372, 376, 377

[56] References Cited

U.S. PATENT DOCUMENTS

| | | | |
|---|---|---|---|
| 3,538,129 | 11/1970 | Sato et al. ............... | 260/376 |
| 3,752,831 | 8/1973 | Diamantoglou et al. ............... | 260/376 |
| 3,767,681 | 10/1973 | Kolliker et al. ............... | 260/372 |
| 3,803,168 | 4/1974 | Kolliker et al. ............... | 260/377 X |
| 3,836,549 | 9/1974 | Yamada ............... | 260/380 |
| 3,929,842 | 12/1975 | Yamada et al. ............... | 260/376 |
| 3,936,477 | 2/1976 | Maier et al. ............... | 260/376 |

*Primary Examiner*—Floyd Dale Higel
*Attorney, Agent, or Firm*—Gerald D. Sharkin; Richard E. Vila; Thomas C. Doyle

[57] ABSTRACT

The present invention relates to 2-phenoxy or 2-phenylthio anthraquinone compounds which bear a group of formula VI,

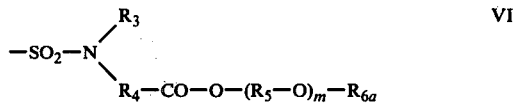

bound to the para position of the phenoxy or phenylthio group, in which $R_3$ is hydrogen; $(C_{1-6})$alkyl; $(C_{1-3})$alkyl monosubstituted by hydroxyl, cyano, $(C_{1-2})$alkylcarbonyloxy, $(C_{1-2})$alkoxycarbonyl or $(C_{1-2})$alkoxycarbonyloxy; $(C_{2-6})$alkenyl; phenyl; or tolyl;

$R_4$ is $-(CH_2)_n-$ or $-CH(R_{10})-$, $R_5$ is $(C_{2-6})$alkylene; $-R_{11}-O-R_{12}-$ or $-CH_2CH_2-O-CH_2CH_2-O-CH_2CH_2-$, $R_{6a}$ is $(C_{1-12})$alkyl; $(C_{1-12})$alkyl monosubstituted by chlorine, bromine or hydroxyl; unsubstituted phenyl$(C_{1-2})$-alkyl, $(C_{5-7})$cycloalkyl or phenyl; or phenyl or phenyl$(C_{1-2})$alkyl in which the phenyl ring is monosubstituted by chlorine, bromine or methyl, $R_{10}$ is $(C_{1-6})$alkyl or phenyl, each of $R_{11}$ and $R_{12}$, independently, is $(C_{2-6})$ alkylene, m is 0 or 1, and n is 1, 2, 3, 4 or 5, which compounds are useful as disperse dyestuffs for dyeing or printing substrates dyeable with disperse dyes, especially linear aromatic polyester and cellulose triacetate.

22 Claims, No Drawings

2-PHENOXY AND 2-PHENYLTHIO ANTHRAQUINONE DISPERSE DYES

IMPROVEMENTS IN OR RELATING TO ORGANIC COMPOUNDS

The present invention relates to anthraquinone compounds.

The present invention provides 2-phenoxy or 2-phenylthio anthraquinone disperse dyestuffs which bear a group of formula VI,

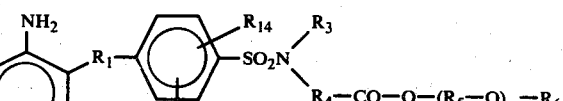

bound to the para position of the phenoxy or phenylthio group, in which $R_3$ is hydrogen; $(C_{1-6})$alkyl; $(C_{1-3})$alkyl monosubstituted by hydroxyl, cyano, $(C_{1-2})$alkylcarbonyloxy, $(C_{1-2})$ alkoxycarbonyl or $(C_{1-2})$alkoxycarbonyloxy; $(C_{2-6})$alkenyl; phenyl; or tolyl;

$R_4$ is —$(CH_2)_n$— or —$CH(R_{10})$—, $R_5$ is $(C_{2-6})$alkylene; —$R_{11}$—O—$R_{12}$— or —$CH_2CH_2$—O—$CH_2CH_2$—O—$CH_2$—, $R_{6a}$ is $(C_{1-12})$alkyl; $(C_{1-12})$alkyl monosubstituted by chlorine, bromine or hydroxyl; unsubstituted phenyl$(C_{1-2})$-alkyl, $(C_{5-7})$ cycloalkyl or phenyl; or phenyl or phenyl$(C_{1-2})$ alkyl in which the phenyl ring is monosubstituted by chlorine, bromine or methyl, $R_{10}$ is $(C_{1-6})$alkyl or phenyl, each of $R_{11}$ and $R_{12}$, independently, is $(C_{2-6})$ alkylene, m is 0 or 1, and n is 1, 2, 3, 4 or 5.

It will be appreciated that the anthraquinone nucleus must bear at least one chromophoric substituent in the 1-, 4-, 5- or 8-position.

It will also be appreciated that the anthraquinone nucleus and the benzene nucleus of the 2-phenoxy or 2-phenylthio group may bear further substituents which are common in the chemistry of anthraquinone disperse dyestuffs. However, substituents or combinations thereof which are known deleteriously to affect the dyeing properties of the molecule, as well as substituents or combinations which are known to give rise to steric and/or stability problems should not, of course, be present in the molecule.

As examples of substituents which give rise to stability problems may be given those which contain the groups

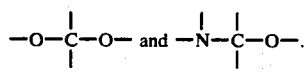

Preferably, where the benzene nucleus of the 2-phenoxy or 2-phenylthio group is substituted it is substituted by up to two chlorine or bromine atoms or monosubstituted by methyl or $(C_{1-2})$alkoxy.

The preferred chromophoric substituents include hydroxy and —$NHR_9$ in which $R_9$ is hydrogen, $(C_{1-6})$alkyl, $(C_{5-7})$cycloalkyl or phenyl. The molecule preferably contains two chromophoric substituents, which substituents are in the 1- and 4-positions. Any further substituents on the anthraquinone nucleus are preferably chlorine or bromine atoms. Preferably the anthraquinone nucleus is further unsubstituted or is further substituted by a single chlorine or bromine atom, especially in the 3-position.

Preferred compounds of the invention are those of formula I′,

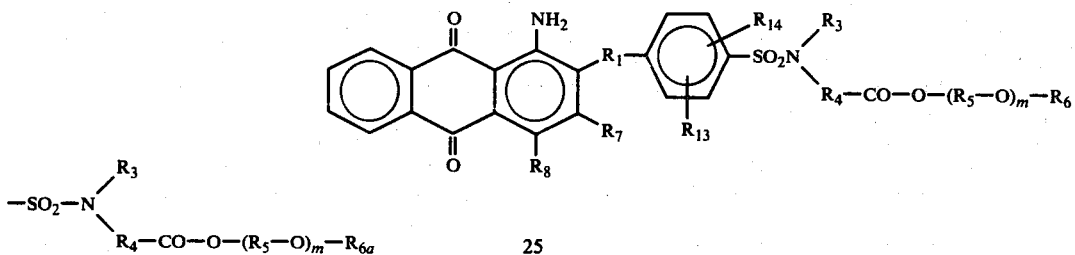

in which $R_1$ is —O— or —S—, $R_3$ to $R_5$ and m are as defined above, $R_6$ is $(C_{1-12})$alkyl; $(C_{1-6})$ alkyl monosubstituted by chlorine, bromine or hydroxyl; unsubstituted phenyl $(C_{1-2})$alkyl, $(C_{5-7})$cycloalkyl or phenyl; or phenyl$(C_{1-2})$alkyl or phenyl in which the phenyl ring is monosubstituted by chlorine, bromine or methyl, $R_7$ is hydrogen, chlorine or bromine, $R_8$ is hydroxyl or —$NHR_9$, $R_9$ is as defined above, either, $R_{13}$ and $R_{14}$ are both hydrogen, chlorine or bromine, or one of $R_{13}$ and $R_{14}$ is hydrogen and the other is methyl or $(C_{1-2})$alkoxy.

Any unsubstituted alkyl as $R_3$ is preferably straight chain and contains 1 to 4 carbon atoms.

Any alkyl as $R_{10}$ is preferably straight chain and contains 1 to 3 carbon atoms.

Any alkylene as $R_5$ may be branched or straight chain and preferably is a $(C_{2-4})$alkylene. More preferably any alkylene as $R_5$ is a $(C_{2-3})$alkylene.

Any unsubstituted alkyl as $R_{6a}$ or $R_6$ may be straight chain or branched and preferably contains 1 to 6 carbon atoms. Any substituted alkyl as $R_{6a}$ or $R_6$ is preferably straight chain and contains up to 4 carbon atoms and is substituted in the β-, δ- or δ-position, preferably in the ω-position. Where $R_{6a}$ or $R_6$ is phenyl, preferably the phenyl is unsubstituted or substituted by chlorine or methyl. Any phenylalkyl as $R_{6a}$ or $R_6$ is preferably unsubstituted or substituted by methyl or chlorine. Any cycloalkyl as $R_{6a}$ or $R_6$ is preferably a $C_5$ or $C_6$ cycloalkyl.

Any alkyl as $R_9$ may be straight chain or branched and preferably contains 1 to 4 carbon atoms. Any cycloalkyl as $R_9$ is preferably cyclohexyl. Preferably the group —$NHR_9$ is —$NH_2$, $(C_{1-4})$alkylamino, cyclohexylamino or phenylamino.

Preferably $R_1$ is —O—.

$R_3$ is preferably $R_3'$, where $R_3'$ is hydrogen or $(C_{1-4})$alkyl. More preferably $R_3$ is $R_3''$, where $R_3''$ is hydrogen or methyl.

$R_4$ is preferably $R_4'$, where $R_4'$ is —$(CH_2)_{n'}$, where n′ is 1, 2, 3 or 5, preferably 1, 2 or 5, especially 1, or —CH($R_{10}'$)—, where $R_{10}'$ is a linear ($C_{1-3}$)alkyl or phenyl.

$R_5$ is preferably $R_5'$, where $R_5'$ is ($C_{2-4}$) alkylene or —CH$_2$CH$_2$—O—CH$_2$CH$_2$—. More preferably $R_5$ is $R_5''$, where $R_5''$ is 1,2-ethylene, 1-methyl-1,2-ethylene or —CH$_2$CH$_2$—O—CH$_2$CH$_2$—, especially 1,2-ethylene.

$R_6$ is preferably $R_6'$, where $R_6'$ is ($C_{1-6}$)alkyl, β-, γ- or δ-hydroxy($C_{2-4}$)alkyl, especially ω-hydroxy($C_{2-4}$)alkyl, ($C_{5-6}$)cycloalkyl, β-chloro- or bromoethyl, phenyl, chlorophenyl, tolyl, chlorobenzyl, phenyl($C_{1-2}$)alkyl or tolylethyl, especially ($C_{1-6}$)alkyl.

$R_7$ is preferably hydrogen.

$R_8$ is preferably $R_8'$, where $R_8'$ is hydroxyl, —NH$_2$, ($C_{1-4}$)alkylamino, cyclohexylamino or phenylamino, more preferably hydroxyl.

$R_{13}$ and $R_{14}$ are preferably $R_{13}'$ and $R_{14}'$, where either $R_{13}'$ and $R_{14}'$ are both hydrogen or chlorine, or one of $R_{13}'$ and $R_{14}'$ is hydrogen and the other is methyl or ($C_{1-2}$) alkoxy. More preferably, $R_{13}$ and $R_{14}$ are both hydrogen.

m is preferably 0.

Preferred compounds of formula I' are those in which $R_3$ is $R_3'$, $R_4$ is $R_4'$, $R_5$ is $R_5'$, $R_6$ is $R_6'$, $R_7$ is hydrogen, $R_8$ is $R_8'$ and $R_{13}$ and $R_{14}$ are $R_{13}'$ and $R_{14}'$, with those compounds where $R_1$ is oxygen and where $R_{13}$ and $R_{14}$ are both hydrogen and m is O being even more preferred.

Especially preferred compounds of formula I' are those in which $R_1$ is oxygen, $R_3$ is $R_3'$, $R_4$ is $R_4'$, $R_5$ is $R_5'$, preferably $R_5''$, $R_6$ is $R_6'$, $R_7$ is hydrogen, $R_8$ is $R_8'$ and $R_{13}$ and $R_{14}$ are both hydrogen, with those compounds where $R_5$ is 1,2-ethylene, $R_6$ is ($C_{1-6}$)alkyl, $R_3$ is $R_3''$, n is 1,2 or 5, especially 1, m is O and $R_8$ is hydroxyl being most preferred.

The present invention also provides a process for the production of the 2-phenoxy or 2-phenylthio anthraquinone compounds of the invention comprising (a) condensing a corresponding 2-parasulphophenoxy or 2-parasulphophenylthio anthraquinone, or a functional derivative thereof, with a compound of formula II,

$$R_3-NH-R_4-CO-O-(R_5O)_m-R_6 \qquad II$$

or (b) esterifying a corresponding 2-phenoxy or 2-phenylthio anthraquinone having a group of formula III

$$-SO_2-NR_3R_4COOH \qquad III$$

or a functional derivative thereof,
in the para position of the 2-phenoxy or 2-phenylthio benzene nucleus,
with an alcohol of formula IV,

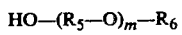
$$HO-(R_5-O)_m-R_6 \qquad IV$$

The above reactions may be carried out in accordance with known methods. Preferred functional derivatives of the sulphonic acid and carboxylic acid are the acid halides, in particular the acid chloride.

The starting materials for the above processes are either known or may be obtained in conventional manner from available starting materials.

The resulting compounds of the invention may be isolated in conventional manner.

The dyestuffs according to the invention are useful as disperse dyes for dyeing or printing substrates dyeable with disperse dyes, e.g. consisting of or comprising synthetic or semi-synthetic, hydrophobic, high molecular weight organic materials. Preferred substrates are those which consist of linear aromatic polyester or cellulose triacetate. The substrate is preferably textile and may, for example, be in loose fibre, fabric or yarn from. Dyeing or printing may be carried out in accordance with known methods, for example, as described in French Patent No. 1,445,371.

The dyestuffs may be made up into dyeing preparations in accordance with known methods, for example by grinding in the presence of dispersing agents and/or fillers, with subsequent spray or vacuum drying.

The dyeings obtained possess notable light and thermofixation fastness. They are also notably fast to permanent pleating, washing and sweat. The dyes build-up well, especially on polyester. They give even dyeings on stripy polyester.

The following Examples further serve to illustrate the invention. In the Examples the parts are by weight and the temperatures are in degrees Centigrade.

EXAMPLE 1

(a) 12 Parts of 1-amino-2-(4'-chlorosulphonyl-phenoxy)-4-hydroxyl anthraquinone, 5 parts of glycinebutylester hydrochloride and 3 parts of triethylamine in 60 parts of dimethylformamide are heated to 60°. At this temperature a solution of 3 parts of triethylamine in 10 parts of diethylformamide is added dropwise over a period of 30 minutes. The reaction mixture is held for a further 30 minutes at 60° and is then poured into 600 parts of water. The product of formula

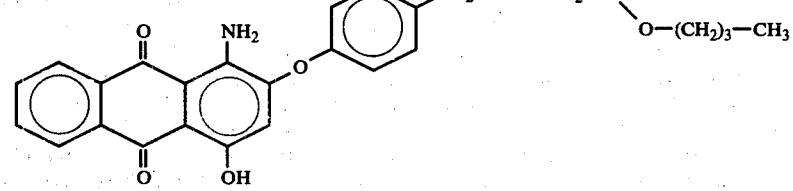

is filtered, washed with water until the filtrate is colourless and dried in vacuo.

(b) 12 Parts 1-amino-2-(4'-carboxymethylsulphamyl-phenoxy)-4-hydroxyanthraquinone are added to a solution of 3 parts of hydrochloric acid in 600 parts n-butanol and are heated to the boil. Water produced during the reaction is removed by azeotropic distillation. After completion of the reaction the mixture is concentrated and poured onto water. The product which is identical to that obtained above under procedure (a) is filtered, washed with water and dried in vacuum.

In the following Table 1, further dyestuffs of formula I' are given which may be prepared in analogy with the procedures of Example 1. In all cases $R_1$ is oxygen, $R_7$ is hydrogen, $R_8$ is —OH and $R_{13}$ and $R_{14}$ are hydrogen. The dyestuffs dye polyester fibre in red shades.

TABLE 1

| Example No. | $R_3$ | $R_4$ | m | $R_5$ | $R_6$ |
|---|---|---|---|---|---|
| 2 | —H | —CH$_2$— | 0 | — | —CH$_3$ |
| 3 | " | " | 0 | — | —C$_2$H$_5$ |
| 4 | " | " | 0 | — | —(CH$_2$)$_2$CH$_3$ |
| 5 | " | " | 0 | — | —CH(CH$_3$)$_2$ |
| 6 | " | " | 0 | — | —CH$_2$—CH(CH$_3$)$_2$ |
| 7 | " | " | 0 | — | —CH(CH$_3$)(C$_2$H$_5$) |
| 8 | " | " | 0 | — | —(CH$_2$)$_4$CH$_3$ |
| 9 | " | " | 0 | — | —CH$_2$—CH(CH$_3$)(C$_2$H$_5$) |
| 10 | " | " | 0 | — | —(CH$_2$)$_5$—CH$_3$ |
| 11 | " | " | 0 | — | —CH$_2$—CH(CH$_3$)((CH$_2$)$_2$CH$_3$) |
| 12 | " | —CH$_2$CH$_2$— | 0 | — | —C$_6$H$_{11}$ (cyclohexyl) |
| 13 | " | " | 0 | — | —C$_5$H$_9$ (cyclopentyl) |
| 14 | " | —CH$_2$— | 0 | — | —CH$_2$—C$_6$H$_5$ |
| 15 | " | " | 0 | — | —CH(CH$_3$)—C$_6$H$_5$ |
| 16 | " | " | 1 | —CH$_2$CH$_2$— | —CH$_3$ |
| 17 | " | " | 1 | " | —C$_2$H$_5$ |
| 18 | " | " | 1 | " | —CH(CH$_3$)$_2$ |
| 19 | " | " | 1 | " | —(CH$_2$)$_3$CH$_3$ |
| 20 | " | " | 1 | " | —C$_6$H$_5$ |
| 21 | " | " | 1 | —CH(CH$_3$)—CH$_2$— | —CH$_3$ |
| 22 | " | " | 1 | —CH$_2$CH$_2$—O—CH$_2$CH$_2$— | " |
| 23 | " | " | 1 | " | —C$_2$H$_5$ |
| 24 | " | " | 1 | " | —(CH$_2$)$_3$CH$_3$ |
| 25 | —CH$_3$ | " | 0 | — | —C$_2$H$_5$ |
| 26 | " | " | 0 | — | —(CH$_2$)$_3$CH$_3$ |
| 27 | —H | —CH(CH$_3$)— | 0 | — | — |
| 28 | " | " | 1 | —CH$_2$CH$_2$— | —C$_2$H$_5$ |
| 29 | " | —CH(CH(CH$_3$)$_2$)— | 0 | — | — |
| 30 | " | —CH(C$_6$H$_5$)— | 0 | — | —CH$_3$ |
| 31 | " | —CH$_2$CH$_2$— | 0 | — | —C$_2$H$_5$ |
| 32 | " | " | 0 | — | —(CH$_2$)$_2$CH$_3$ |
| 33 | " | " | 0 | — | —CH(CH$_3$)$_2$ |
| 34 | " | " | 0 | — | —(CH$_2$)$_3$CH$_3$ |
| 35 | " | " | 0 | — | —CH$_3$ |
| 36 | " | " | 0 | — | —CH(CH$_3$)(C$_2$H$_5$) |
| 37 | " | " | 0 | — | —(CH$_2$)$_4$CH$_3$ |
| 38 | " | " | 0 | — | —(CH$_2$)$_5$CH$_3$ |
| 39 | " | " | 1 | —CH$_2$CH$_2$— | —CH$_3$ |
| 40 | " | " | 1 | " | —C$_2$H$_5$ |
| 41 | " | " | 1 | " | —CH(CH$_3$)$_2$ |
| 42 | " | " | 1 | —CH$_2$CH$_2$—O—CH$_2$CH$_2$— | —CH$_3$ |
| 43 | " | —(CH$_2$)$_3$— | 0 | — | —C$_2$H$_5$ |
| 44 | " | " | 0 | — | —CH(CH$_3$)$_2$ |
| 45 | " | " | 0 | — | —(CH$_2$)$_3$CH$_3$ |
| 46 | " | " | 0 | — | — |
| 47 | " | " | 1 | —CH$_2$CH$_2$— | —CH$_3$ |
| 48 | " | —(CH$_2$)$_5$— | 0 | — | " |
| 49 | " | " | 0 | — | —C$_2$H$_5$ |
| 50 | " | " | 0 | — | —CH(CH$_3$)$_2$ |

TABLE 1-continued

| Example No. | $R_3$ | $R_4$ | m | $R_5$ | $R_6$ |
|---|---|---|---|---|---|
| 51 | " | —CH$_2$— | 0 | — | —CH$_2$CH$_2$—Cl |
| 52 | " | " | 0 | — | —CH$_2$CH$_2$—Br |
| 53 | " | " | 0 | — | —(CH$_2$)$_4$—OH |
| 54 | " | " | 1 | —CH$_2$CH$_2$— | 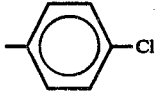 |
| 55 | " | " | 1 | " | 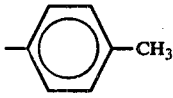 |
| 56 | " | " | 0 | — |  |
| 57 | " | " | 0 | — | 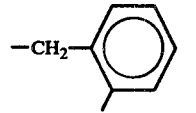 |
| 58 | " | " | 0 | — | 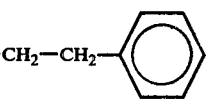 |
| 59 | " | " | 0 | — |  |
| 60 | —CH$_3$ | " | 0 | — | —CH$_3$ |
| 61 | " | " | 0 | — | —CH(CH$_3$)$_2$ |
| 62 | " | " | 0 | — | —CH(CH$_3$)C$_2$H$_5$ |
| 63 | " | " | 0 | — | —CH$_2$CH(CH$_3$)$_2$ |
| 64 | H | —CH—<br>\|<br>CH$_3$ | 0 | — | —CH$_3$ |
| 65 | " | " | 0 | — | —C$_2$H$_5$ |
| 66 | " | " | 0 | — | —CH(CH$_3$)$_2$ |
| 67 | " | " | 0 | — | —CH(CH$_3$)C$_2$H$_5$ |
| 68 | " | " | 0 | — | —CH$_2$CH(CH$_3$)$_2$ |
| 69 | " | " | 1 | — | —CH$_3$ |

Further dyestuffs of formula

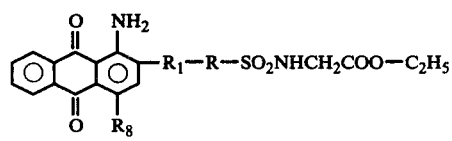

which are prepared in analogous manner to the procedure described in Example 1, are given in Table 2. The dye shade on polyester fibre is given in each case.

TABLE 2

| Example No. | $R_1$ | R | $R_7$ | $R_8$ | Shade on polyester fibre |
|---|---|---|---|---|---|
| 70 | —S— |  | —H | —OH | violet |
| 71 | —O— | " | —Cl | " | red |
| 72 | " | " | —Br | " | " |
| 73 | " |  | " | " | " |
| 74 | " |  | " | " | " |

TABLE 2-continued

| Example No. | R₁ | R | R₇ | R₈ | Shade on polyester fibre |
|---|---|---|---|---|---|
| 75 | " | (phenyl with CH₃) | " | " | " |
| 76 | " | (phenyl with OCH₃) | " | " | " |
| 77 | " | (phenyl) | " | —NH₂ | violet |
| 78 | " | " | " | —NH—C₂H₅ | blue |
| 79 | " | " | " | —NH—(cyclohexyl, H) | " |
| 80 | " | " | " | —NH—(phenyl) | " |
| 81 | —S— | " | " | —NH—CH(CH₃)(C₂H₅) | " |

APPLICATION EXAMPLE A

6 Parts of the dyestuff of Example 1 are ground with 14 parts of the sodium salt of lignin sulphonic acid, 180 parts of water and 400 parts of silica quartz beads until the average particle size is less than 1μ. The suspension is then filtered. 60 parts of the thus obtained dyestuff preparation are added to 4000 parts of water and the thus obtained dye bath, which is buffered to pH 5, is heated to 60°. 100 parts of polyester fibre fabric are added to the bath together with 30 parts of ortho phenylphenol. The bath is heated to the boil and the fabric is dyed for 1 hour at the boil. After cooling, rinsing, soaping, rinsing again and drying a brilliant bluish-red even dyeing is obtained.

The dyestuffs of Examples 2 to 81 can be used to dye polyester fibre fabric in accordance with the above procedure.

What is claimed is:

1. A compound of the formula,

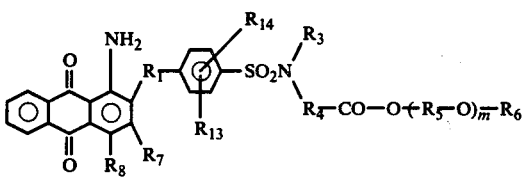

in which $R_1$ is —O— or —S—,
$R_3$ is hydrogen; $(C_{1-6})$alkyl; $(C_{1-3})$alkyl monosubstituted by hydroxyl, cyano, $(C_{1-2})$-alkylcarbonyloxy, $(C_{1-2})$alkoxycarbonyl or $(C_{1-2})$alkoxycarbonyloxy; $(C_{2-6})$alkenyl; phenyl; or tolyl;
$R_4$ is —$(CH_2)_n$— or —$CH(R_{10})$—,
$R_5$ is $(C_{2-6})$alkylene; —$R_{11}$—O—$R_{12}$—or —$CH_2CH_2$—O—$CH_2CH_2$—O—$CH_2CH_2$—,
$R_6$ is $(C_{1-12})$alkyl; $(C_{1-6})$alkyl monosubstituted by chlorine, bromine or hydroxyl; unsubstituted phenyl $(C_{1-2})$alkyl, $(C_{5-7})$-cycloalkyl or phenyl; or phenyl $(C_{1-2})$-alkyl or phenyl in which the phenyl ring is monosubstituted by chlorine, bromine or methyl,
$R_7$ is hydrogen, chlorine or bromine,
$R_8$ is hydroxyl or —$NHR_9$,
$R_9$ is hydrogen, $(C_{1-6})$alkyl, $(C_{5-7})$cycloalkyl or phenyl,
$R_{10}$ is $(C_{1-6})$alkyl or phenyl,
each of $R_{11}$ and $R_{12}$, independently, is $(C_{2-6})$alkylene,
either, $R_{13}$ and $R_{14}$ are both hydrogen, chlorine or bromine,
or one of $R_{13}$ and $R_{14}$ is hydrogen and the other is methyl or $(C_{1-2})$alkoxy,
m is 0 or 1, and
n is 1, 2, 3, 4 or 5.

2. A compound according to claim 1, in which $R_3$ is $R_3'$, where $R_3'$ is hydrogen or $(C_{1-4})$alkyl.

3. A compound according to claim 2, in which $R_4$ is $R_4'$, where $R_4'$ is —$(CH_2)_{n'}$—, where n' is 1, 2, 3 or 5.

4. A compound according to claim 3, in which $R_5$ is $R_5'$, where $R_5'$ is $(C_{2-4})$alkylene or —$CH_2CH_2$—O—$CH_2CH_2$—.

5. A compound according to claim 4, in which $R_6$ is $R_6'$, where $R_6'$ is $(C_{1-6})$alkyl, β-, γ- or δ-hydroxy$(C_{2-4})$alkyl, $(C_{5-6})$cycloalkyl, β-chloro- or bromoethyl, phenyl, chlorophenyl, tolyl, chlorobenzyl, phenyl $(C_{1-2})$alkyl or tolylethyl.

6. A compound according to claim 5, in which $R_7$ is hydrogen.

7. A compound according to claim 6, in which $R_8$ is $R_8'$, where $R_8'$ is hydroxyl, —$NH_2$, $(C_{1-4})$alkylamino, cyclohexylamino or phenylamino.

8. A compound according to claim 7, in which $R_{13}$ and $R_{14}$ are $R_{13}'$ and $R_{14}'$, where either $R_{13}'$ and $R_{14}'$ are both hydrogen or one of $R_{13}'$ and $R_{14}'$ is hydrogen and the other is methyl or $(C_{1-2})$alkoxy.

9. A compound according to claim 8, in which $R_1$ is oxygen.

10. A compound according to claim 9, in which m is 0.

11. A compound according to claim 10, in which $R_{13}$ and $R_{14}$ are both hydrogen.

12. A compound according to claim 1, in which $R_1$ is oxygen, $R_3$ is $R_3'$, where $R_3'$ is hydrogen or $(C_{1-4})$alkyl, $R_4$ is $R_4'$, where $R_4'$ is —$(CH_2)_{n'}$—, where n' is 1, 2, 3 or 5, $R_5$ is 1,2-ethylene, 1-methyl-1,2-ethylene or —$CH_2CH_2$—O—$CH_2$—, $R_6$ is $R_6'$, where $R_6'$ is $(C_{1-6})$alkyl, β-, γ- or ω- hydroxy$(C_{2-4})$alkyl, $(C_{5-6})$cycloalkyl, β-chloro- or bromoethyl, phenyl, chlorophenyl, tolyl, chlorobenzyl, phenyl$(C_{1-2})$alkyl or tolylethyl, $R_7$ is hydrogen, $R_8$ is $R_8'$, where $R_8'$, where $R_8'$ is hydroxyl, —$NH_2$, $(C_{1-4})$alkylamino, cyclohexylamino or phenylamino, m is O, and $R_{13}$ and $R_{14}$ are both hydrogen.

13. A compound according to claim 12, in which $R_4$ is $R_4'$, where n' is 1, 2 or 5.

14. A compound according to claim 13, in which $R_5$ is 1,2-ethylene.

15. A compound according to claim 12 in which $R_6$ is $(C_{1-6})$alkyl.

16. A compound according to claim 12, in which $R_3$ is hydrogen or methyl.

17. A compound according to claim 13, in which n is 1.

18. A compound according to claim 1, of formula,

[anthraquinone structure with $NH_2$, OH, $-O-\langle\text{phenyl}\rangle-SO_2NHCH_2CO-OCH_3$]

19. A compound according to claim 1, of formula,

[anthraquinone structure with $NH_2$, OH, $-O-\langle\text{phenyl}\rangle-SO_2NHCH_2CO-O-CH(CH_3)_2$]

20. A compound according to claim 1, of formula,

[anthraquinone structure with $NH_2$, OH, $-O-\langle\text{phenyl}\rangle-SO_2NHCH_2CO-O-CH_2CH(CH_3)_2$]

21. A compound according to claim 1, of formula,

[anthraquinone structure with $NH_2$, OH, $-O-\langle\text{phenyl}\rangle-SO_2NHCH_2CO-O-CH(CH_3)(C_2H_5)$]

22. A disperse dye according to claim 1 wherein the chromphoric substituent is hydroxy or $-NHR_9$ wherein $R_9$ is hydrogen, $(C_{1-6})$ alkyl, $(C_{5-7})$ cycloalkyl or phenyl.

* * * * *

UNITED STATES PATENT OFFICE
CERTIFICATE OF CORRECTION

Patent No. 4,138,414            Dated February 6, 1979

Inventor(s) Werner Baumann

It is certified that error appears in the above-identified patent and that said Letters Patent are hereby corrected as shown below:

Col. 10, line 64; delete "$H_2-O-CH_2-$," and insert in its place --$H_2-O-CH_2CH_2-$,--.

Col. 10, line 65; delete the symbol "$\omega-$" and insert in its place the symbol -- $\delta-$ --.

Col. 10, line 67; delete the word "tolyethyl" and insert in its place the word --tolylethyl--.

Col. 10, line 68; delete the phrase "where $R_8'$," (first occurrence).

Signed and Sealed this

*Eighteenth* Day of *September 1979*

[SEAL]

*Attest:*

LUTRELLE F. PARKER

*Attesting Officer*     *Acting Commissioner of Patents and Trademarks*